(12) United States Patent
Lee et al.

(10) Patent No.: US 10,586,030 B2
(45) Date of Patent: Mar. 10, 2020

(54) METHOD AND DEVICE FOR FINGERPRINT AUTHENTICATION

(71) Applicant: SUPREMA INC., Gyeonggi-do (KR)

(72) Inventors: Kideok Lee, Gyeonggi-do (KR);
Hochul Shin, Gyeonggi-do (KR);
Hyeonchang Lee, Gyeonggi-do (KR);
Jong Man Lee, Gyeonggi-do (KR);
Bong Seop Song, Gyeonggi-do (KR);
Jae Won Lee, Gyeonggi-do (KR)

(73) Assignee: SUPREMA INC., Seongnam-si (KR)

( * ) Notice: Subject to any disclaimer, the term of this patent is extended or adjusted under 35 U.S.C. 154(b) by 107 days.

(21) Appl. No.: 15/632,987

(22) Filed: Jun. 26, 2017

(65) Prior Publication Data
US 2017/0372051 A1 Dec. 28, 2017

(30) Foreign Application Priority Data
Jun. 28, 2016 (KR) .................. 10-2016-0081130

(51) Int. Cl.
*G06F 21/32* (2013.01)
*G06K 9/00* (2006.01)
*H04L 9/32* (2006.01)

(52) U.S. Cl.
CPC ......... *G06F 21/32* (2013.01); *G06K 9/00087* (2013.01); *H04L 9/3231* (2013.01)

(58) Field of Classification Search
CPC G06F 21/32; G06K 9/00087; G06K 9/00899; H04L 9/3231
USPC ............................................................ 726/6
See application file for complete search history.

(56) References Cited

U.S. PATENT DOCUMENTS

| 10,262,186 | B2* | 4/2019 | Lee | G06K 9/001 |
|---|---|---|---|---|
| 2006/0210126 | A1* | 9/2006 | Cho | G07C 9/00158 382/124 |
| 2013/0208103 | A1* | 8/2013 | Sands | G06F 21/31 348/78 |
| 2014/0223571 | A1* | 8/2014 | Koara | G05B 19/048 726/26 |
| 2014/0359757 | A1* | 12/2014 | Sezan | G06F 21/32 726/19 |

(Continued)

FOREIGN PATENT DOCUMENTS

| JP | 2010-198536 B | 9/2010 |
|---|---|---|
| JP | 2013-210902 A | 10/2013 |

*Primary Examiner* — Carl G Colin
*Assistant Examiner* — Tarek Elarabi
(74) *Attorney, Agent, or Firm* — Brinks Gilson & Lione

(57) ABSTRACT

There is provided a fingerprint authentication method. The method includes a first step of acquiring measurement data for a part of a fingerprint, a second step of calculating a matching rate by comparing the measurement data with at least one of a plurality of registration data, a third step of determining whether the matching rate is equal to or greater than a threshold and whether the measurement data has been previously processed for an authentication, a fourth step of calculating a security level accumulation value based on a result of the third step, and a fifth step of determining whether the security level accumulation value is equal to or greater than a threshold. If NO in the fifth step, processes of the first to fifth steps are repeated. If YES in the fifth step, a success of the authentication is determined and outputted.

7 Claims, 3 Drawing Sheets

(56) References Cited

U.S. PATENT DOCUMENTS

| | | | |
|---|---|---|---|
| 2015/0254446 A1* | 9/2015 | LaCous | G06F 21/32 726/19 |
| 2016/0147987 A1* | 5/2016 | Jang | G06F 21/32 726/19 |
| 2018/0008171 A1* | 1/2018 | Lee | A61B 5/1172 |

* cited by examiner

METHOD AND DEVICE FOR FINGERPRINT AUTHENTICATION

CROSS-REFERENCE TO RELATED APPLICATIONS

This application is based on and claims priority from Korean Patent Application No. 10-2016-0081130, filed on Jun. 28, 2016, the disclosure of which is incorporated herein in its entirety by reference.

TECHNICAL FIELD

The present disclosure relates to a fingerprint authentication method and a fingerprint authentication device, and more particularly, to a fingerprint authentication method and a fingerprint authentication device for processing a fingerprint authentication depending on a security level by using partial fingerprint measurement data corresponding to a part of an entire fingerprint.

BACKGROUND

As is well known in the art, biometric features currently used for authentication purposes in a biometric authentication system include fingerprints, facial patterns, voice patterns, hand measurements, eye retinas and irises, vein patterns and the like, and researches and studies on each of these features have been actively conducted.

In recent years, biometric authentication has been adopted for portable electronic devices such as smartphones and the like, and fingerprint authentication has been widely adopted among various types of biometric authentication for such portable electronic devices. The fingerprint authentication has advantages of high security level and usability compared to other biometric authentication techniques.

However, a fingerprint sensor installed in the portable electronic device such as smartphones is very small in size due to cost savings and space limitations, and therefore, only a very small portion of a fingerprint may be inputted at a time.

As the fingerprint sensor becomes smaller, the size of the fingerprint images captured for authentication purpose and registration purpose also becomes smaller, so that the amount of fingerprint information is also reduced. Further, a portion of the fingerprint inputted when registering in advance the fingerprint data for authentication procedure and a portion of the fingerprint inputted when the authentication is requested may be completely different from each other. Thus, it may often occur in practice that a fingerprint overlap area does not exist.

In order to solve the above-described problems, there is an approach that not only a plurality of fingerprint data for different portions of the fingerprint are registered and stored when registering in advance the fingerprint data to be used for the authentication procedure, but also a security level is adjusted by lowering a threshold for determining a success or a failure of authentication. For example, as for an access control system requiring high security, a relatively high security level is set to have a false acceptance rate (FAR) of 1/100,000,000. However, as for a smartphone in which a fingerprint authentication is mainly applied to a screen unlock function, a relatively low security level is set to have the FAR of 1/50,000.

Meanwhile, in recent years, the portable electronic device such as a smartphone or the like has not been used only for a single function such as making a phone call, but has been used for various purposes, especially in a financial field such as a mobile banking which requires a much higher security level.

However, the conventional fingerprint recognition techniques employed in the portable electronic device such as the smartphone or the like are operated by appropriately lowering the FAR for the user not to feel uncomfortable. This may be problematic because the security performance is too low for the financial field such as the mobile banking.

Reference Document: Korean Patent Application Publication No. 2015-0080736

In view of the above, aspects of the present disclosure provide a method and a device for fingerprint authentication, which are capable of performing the fingerprint authentication by using partial fingerprint measurement data corresponding to a part of the entire fingerprint while adjusting a security level of the fingerprint authentication.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

SUMMARY

In accordance with an aspect of the present disclosure, there is provided a fingerprint authentication method performed by a fingerprint authentication device, the fingerprint authentication method including: acquiring partial fingerprint measurement data corresponding to a part of a single fingerprint; calculating a matching rate by comparing the partial fingerprint measurement data with at least one of a plurality of partial fingerprint registration data stored in advance, each of which corresponds to a part of a single fingerprint; first determining whether the matching rate is equal to or greater than an authentication threshold and whether the partial fingerprint measurement data has been previously processed for an authentication; calculating a security level accumulation value indicating high or low of a security level based on a result of the first determining; second determining whether the security level accumulation value is equal to or greater than a predetermined security level threshold; repeating processes of the acquiring, the calculating the matching rate, the first determining, the calculating the security level accumulation value and the second determining if the security level accumulation value is less than the security level threshold; and determining and outputting a success of the authentication if the security level accumulation value is equal to or greater than the security level threshold.

Further, the security level threshold may be determined based on a type of service to be operated through the authentication.

Further, the authentication threshold may be determined depending on the predetermined security level threshold.

Further, the fingerprint authentication method described above may further include outputting a difference between the security level threshold and the security level accumulation value on a screen or through a voice after the calculating the security level accumulation value.

Further, if the matching rate is equal to or greater than the authentication threshold and it is determined that the partial fingerprint measurement data has not been previously processed for the authentication, the security level accumulation value may be incremented. If the matching rate is equal to or greater than the authentication threshold and it is determined that the partial fingerprint measurement data has been previously processed for the authentication, the security level accumulation value may be maintained, and if the matching rate is less than the authentication threshold, the security level accumulation value may be decremented.

In accordance with another aspect of the present disclosure, there is provided a computer program stored on a non-transitory computer-readable storage medium, which when executed by a processor performs the fingerprint authentication method described above.

In accordance with still another aspect of the present disclosure, there is provided a non-transitory computer-readable storage medium storing instructions which, when executed by a processor, performs the fingerprint authentication method described above.

In accordance with still another aspect of the present disclosure, there is provided a fingerprint authentication device including: a data storage unit configured to store a plurality of partial fingerprint registration data, each of which corresponds to a part of a single fingerprint; a data input unit configured to receive partial fingerprint measurement data for an authentication, which corresponds to a part of a single fingerprint; a control unit configured to perform the authentication by comparing the plurality of the partial fingerprint registration data and the partial fingerprint measurement data; and an output unit configured to output a result of the authentication under a control of the control unit. The control unit performs steps of: acquiring the partial fingerprint measurement data inputted from the data input unit; calculating a matching rate by comparing the partial fingerprint measurement data with at least one of the plurality of the partial fingerprint registration data; first determining whether the matching rate is equal to or greater than an authentication threshold and whether the partial fingerprint measurement data has been previously processed for the authentication; calculating a security level accumulation value indicating high or low of a security level based on a result of the step of first determining; second determining whether the security level accumulation value is equal to or greater than a predetermined security level threshold; repeating the steps of acquiring, calculating the matching rate, first determining, calculating the security level accumulation value and second determining if the security level accumulation value is less than the security level threshold; and determining and outputting a success of the authentication if the security level accumulation value is equal to or greater than the security level threshold.

Further, before the step of second determining is performed by the control unit, the data input unit may receive a type of service to be operated through the authentication and the control unit may determine the predetermined security level threshold in the step of second determining to correspond to the type of service.

Further, the authentication threshold may be determined depending on the predetermined security level threshold.

Further, the control unit may be further configured to control the output unit to output a difference between the security level threshold and the security level accumulation value on a screen or through a voice after the step of calculating the security level accumulation value.

Further, the control unit may perform an increment of the security level accumulation value if the matching rate is equal to or greater than the authentication threshold and it is determined that the partial fingerprint measurement data has not been previously processed for the authentication. The control unit may maintain the security level accumulation value if the matching rate is equal to or greater than the authentication threshold and it is determined that the partial fingerprint measurement data has been previously processed for the authentication, and the control unit may perform a decrement of the security level accumulation value if the matching rate is less than the authentication threshold.

In accordance with the embodiment, the fingerprint authentication can be performed by using the partial fingerprint measurement data for a part of the entire fingerprint while adjusting the security level.

Therefore, it becomes possible to process the fingerprint authentication by lowering the security level for services requiring relatively lower security levels such as a screen unlock and the like. Further, it becomes possible to process the fingerprint authentication by increasing the security level for services requiring relatively higher security levels such as a mobile banking and the like.

BRIEF DESCRIPTION OF THE DRAWINGS

The objects and features of the present disclosure will become apparent from the following description of embodiments, given in conjunction with the accompanying drawings, in which.

DETAILED DESCRIPTION

Advantages and features of the present disclosure, and a method for achieving them will be apparent with reference to the embodiments described herein below in detail together with accompanying drawings. However, it should be noted that the present disclosure is not limited to the embodiments disclosed herein below, but may be implemented in various forms. It should be noted that the embodiments are provided to make the description of the present disclosure complete, and assist those skilled in the art of the present disclosure to understand the scope of present disclosure, defined just by the scope of the claims.

In the following description, well-known functions and/or constitutions will not be described in detail if they would unnecessarily obscure the features of the present disclosure in unnecessary detail. Further, the terms to be described below are defined in consideration of their functions in the embodiments of the present disclosure and may vary depending on the intention of a user or an operator and the practice. Accordingly, the definition may be made on the basis of the content throughout the specification.

Figure 1:
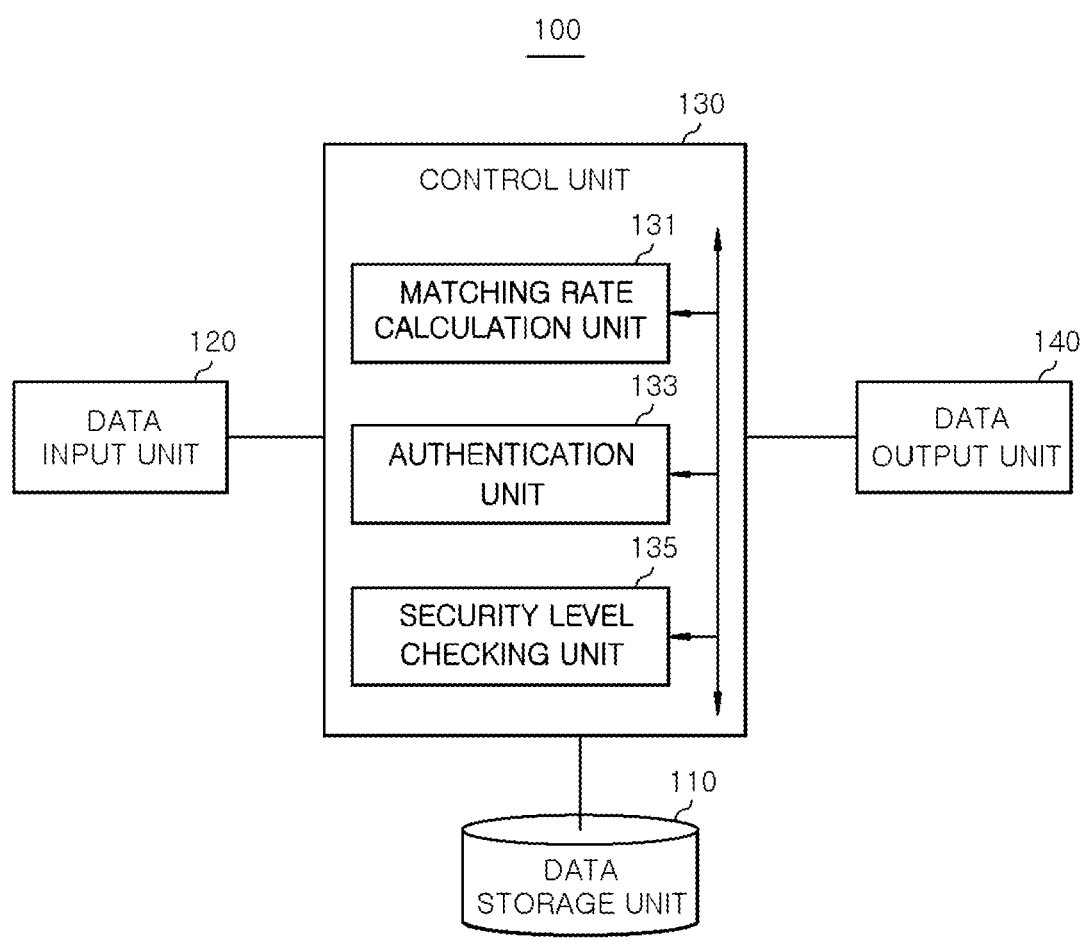
FIG. 1 is a block diagram of a fingerprint authentication device capable of performing a fingerprint authentication method according to an embodiment.

FIG. 1 is a block diagram of a fingerprint authentication device capable of performing a fingerprint authentication method in accordance with an embodiment of the present disclosure.

A fingerprint authentication device 100 includes a data storage unit 110, a data input unit 120, a control unit 130, and an output unit 140. The control unit 130 includes a matching rate calculation unit 131, an authentication unit 133 and a security level checking unit 135.

In the data storage unit 110, a plurality of partial fingerprint registration data for different portions of a fingerprint are registered and stored in advance. Here, each partial fingerprint registration data corresponds to each part of a single fingerprint and may be stored in the date storage unit 110 after being converted into a template form through feature extraction and encryption. The data storage unit 110 may be implemented as a memory device such as an electrically erasable programmable read-only memory (EEPROM).

The data input unit 120 is configured to obtain partial fingerprint measurement data by measuring a part of the fingerprint and transmit the obtained partial fingerprint measurement data to the control unit 130. Here, the partial fingerprint measurement data corresponds to a part of a single fingerprint. This data input unit 120 may be a fingerprint scanning device for capturing a fingerprint image. Alternatively, the data input unit 120 may be a communication interface for receiving fingerprint image data from a separately-installed fingerprint sensor. In addition, the data input unit 120 is also configured to receive a type of service to be operated through the fingerprint authentication, and transmit the type of service to the control unit 130. The type of service may be an unlock of a smartphone, a banking service or the like.

The control unit 130 is configured to perform a fingerprint authentication by comparing the plurality of the partial fingerprint registration data stored in the data storage unit 110 and the partial fingerprint measurement data inputted through the data input unit 120. Here, the fingerprint image obtained from the data input unit 120 may be fingerprint data, having a size of 10 mm×10 mm or less, corresponding to a part of the fingerprint. The control unit 130 may be implemented as a processor such as a central processing unit (CPU).

When information about the type of service to be operated through the fingerprint authentication is inputted from the data input unit 120, the security level checking unit 135 of the control unit 130 determines a security level threshold (e.g., FAR (false acceptance ratio)), which is a target security level set in advance for the inputted service and provides the determined security level threshold to the authentication unit 133. Here, different security level thresholds may be used for different security levels. Specifically, different security level thresholds may be used depending on whether the service to be operated through the fingerprint authentication requires a relatively higher security level or a relatively lower security level. The security level may be classified into, e.g., a range from the highest security level '1' to the lowest security level 'N' where N is a natural number of 2 or more.

The matching rate calculation unit 131 of the control unit 130 is configured to select at least one of the plurality of the partial fingerprint registration data stored in the data storage unit 110 as reference data for comparison, and compare the selected partial fingerprint registration data with the partial fingerprint measurement data inputted through the data input unit 120 to calculate a matching rate. Here, the matching rate calculation unit 131 provides the authentication unit 133 with the calculated matching rate together with identification information on the partial fingerprint registration data having a relatively higher matching rate with respect to the partial fingerprint measurement data.

The authentication unit 133 of the control unit 130 is configured to compare the matching rate calculated by the matching rate calculation unit 131 with an authentication threshold for determining whether the partial fingerprint measurement data can be used for fingerprint authentication. If the matching rate is equal to or greater than the authentication threshold, the authentication unit 133 determines whether the partial fingerprint registration data having the relatively higher matching rate has been previously processed or not. Here, when the identification information on the partial fingerprint registration data, which has a relatively higher matching rate among the plurality of the partial fingerprint registration data with respect to the partial fingerprint measurement data, is provided from the matching rate calculation unit 131, the authentication unit 133 accumulates and stores the identification information. If the identification information has been already accumulated and stored, the authentication unit 133 determines that the corresponding partial fingerprint registration data has been previously processed.

The authentication unit 133 is further configured to calculate a security level accumulation value indicating high or low of the security level. Then, if the matching rate is less than the authentication threshold, the authentication unit 133 performs a decrement of the security level accumulation value to decrease its value. If the matching rate is equal to or greater than the authentication threshold and it is determined that the partial fingerprint measurement data has not been previously processed for the authentication, the authentication unit 133 performs an increment of the security level accumulation value to increase its value. If the matching rate is equal to or greater than the authentication threshold and it is determined that the partial fingerprint measurement data has been previously processed for the authentication, the authentication unit 133 maintains the security level accumulation value. Further, when the matching rate is less than the authentication threshold, the authentication unit 133 may maintain the security level accumulation value instead of performing the decrement of the security level accumulation value.

The authentication unit 133 is further configured to compare a current security level accumulation value with the security level threshold provided from the security level checking unit 135. If the security level accumulation value is equal to or greater than the security level threshold, the authentication unit 133 determines that the authentication has succeeded and controls the output unit 140 to output the success of the authentication. However, if the security level accumulation value is less than the security level threshold, new partial fingerprint measurement data is acquired through the data input unit 120 and then the processes of the comparison with the authentication threshold, the calculation of the security level accumulation value, and the comparison with the security level threshold are sequentially repeated to re-execute the authentication procedure.

Further, the authentication unit 133 controls the output unit 140 to output a difference between the security level accumulation value and the security level threshold provided from the security level checking unit 135 on a screen or through a voice.

When the control unit 130 determines the result (success or failure of the fingerprint authentication) of the fingerprint authentication process for the partial fingerprint measurement data, the output unit 140 outputs the determined result on the screen or through the voice. Further, the output unit 140 outputs the difference between the security level threshold and the current security level accumulation value under the control of the control unit 130 on the screen or through the voice. For example, the output unit 140 may be implemented as a display device or a speaker.

Figure 2:
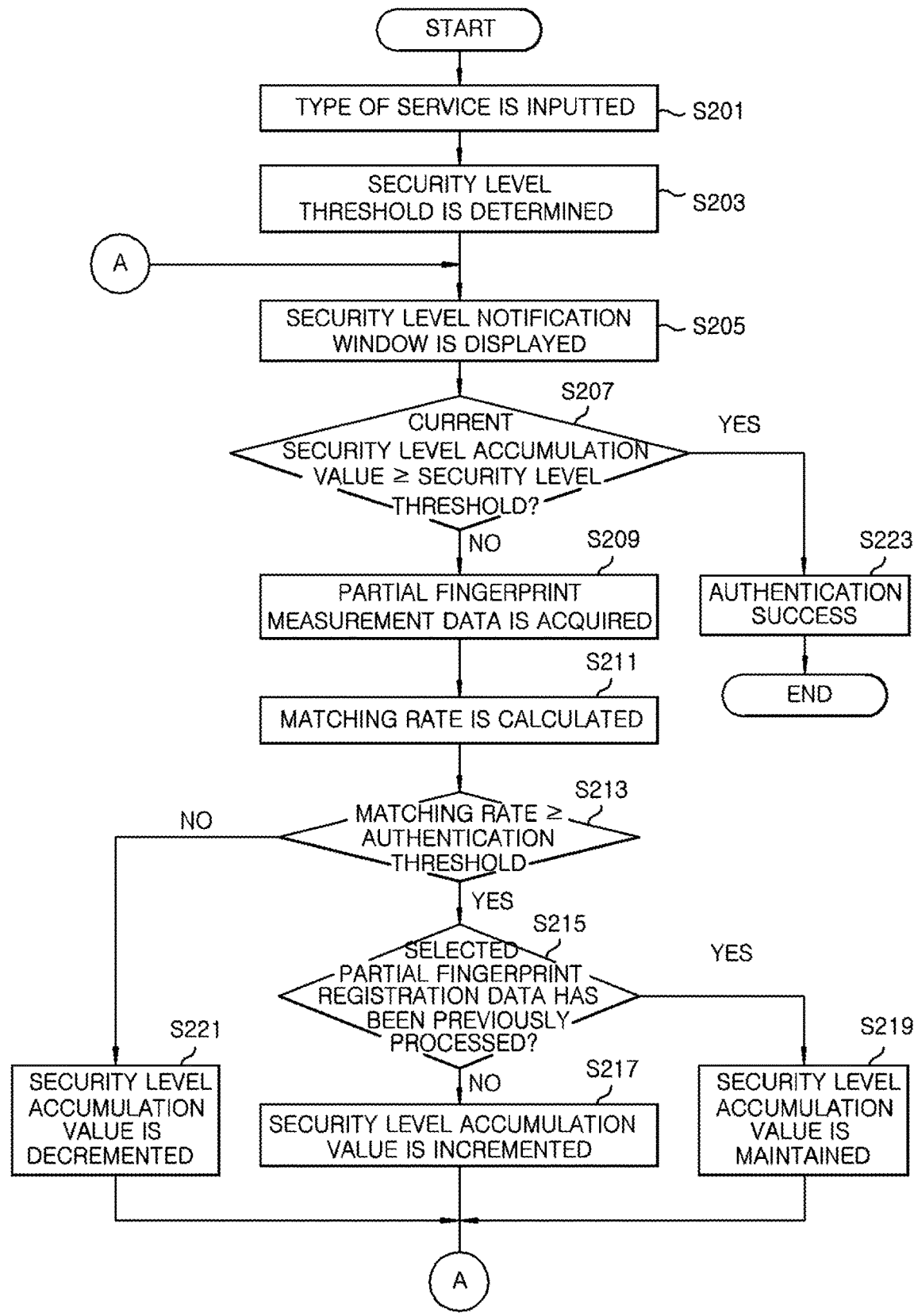
FIG. 2 is a flowchart for explaining the fingerprint authentication method according to the embodiment.
Figure 3:
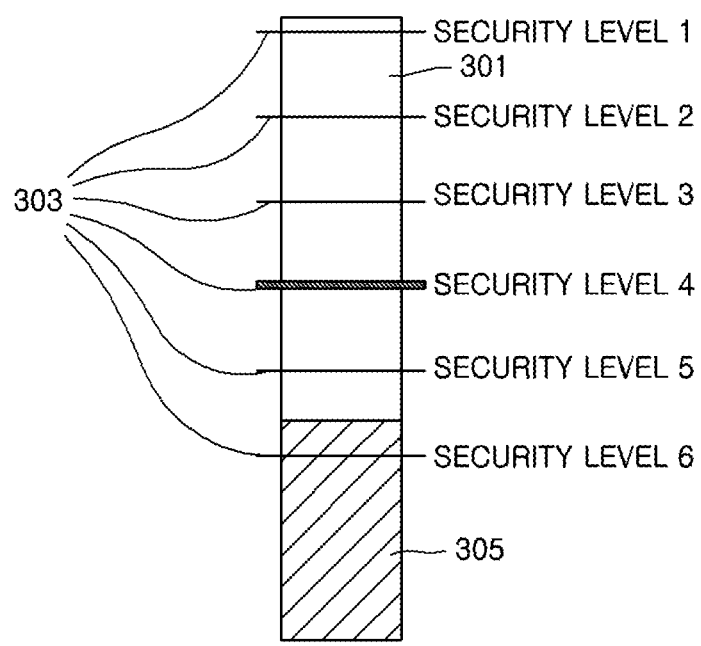
FIG. 3 is an exemplary screen view illustrating a state where a security level is adjusted by using the fingerprint authentication method according to the embodiment.

FIG. 2 is a flowchart for explaining a fingerprint authentication method in accordance with an embodiment of the present disclosure. FIG. 3 is an exemplary screen view illustrating a state where a security level is adjusted by using the fingerprint authentication method in accordance with the embodiment of the present disclosure. Hereinafter, the fingerprint authentication method in accordance with the embodiment of the present disclosure will be described with reference to FIGS. 1 to 3.

First, a plurality of partial fingerprint registration data for different portions of a fingerprint to be authenticated are registered and stored in advance in the data storage unit 110. Here, each partial fingerprint registration data may be stored in the date storage unit 110 after being converted into a template form through feature extraction and encryption.

After the registration of the plurality of partial fingerprint registration data to be used for fingerprint authentication is completed, the data input unit 120 receives a type of service to be operated through fingerprint authentication and transmits the type of service to the control unit 130 (step S201).

Then, the security level checking unit 135 of the control unit 130 checks and finds a security level threshold, which has been set in advance to correspond to the type of service transmitted from the data input unit 120, and determines it as a security level threshold to be used for the fingerprint authentication. Then, the security level checking unit 135 provides the determined security level threshold to the authentication unit 133 (step S203).

Here, the authentication unit 133 controls the output unit 140 to output a currently required security level on a screen or through a voice based on the security level threshold provided from the security level checking unit 135. Then, the output unit 140 outputs the currently required security level on the screen or through the voice (step S205). Specifically, the output unit 140 may output a security level notification window through which the currently required security level among multiple security levels ranging from level '1' indicating the highest security level to level 'N' indicating the lowest security level can be identified. In FIG. 3, six levels of security level indicators 303 from level '1' to level '6' are displayed on a bar graph 301 indicating high or low of the security level. In this example, an indicator of level '4' as the currently required security level is represented in bold. Further, on the bar graph 301, a current security level accumulation value 305 is displayed to be identified, which will be described later in detail.

In step S207, the authentication unit 133 of the control unit 130 compares the current security level accumulation value with the security level threshold received from the security level checking unit 135. If the current security level accumulation value is equal to or greater than the security level threshold (YES in step S207), the authentication unit 133 determines that the authentication has succeeded. However, if the current security level accumulation value is less than the security level threshold (NO in step S207), the authentication unit 133 determines that the authentication has failed. In this regard, before partial fingerprint measurement data is acquired through the data input unit 120, the current security level accumulation value may be "0" and, at this time, the authentication unit 133 determines that the authentication has failed.

Further, if 'No' in step S207, the data input unit 120 obtains partial fingerprint measurement data by measuring a part of the fingerprint and transmits the obtained partial fingerprint measurement data to the control unit 130 (step S209).

Then, the matching rate calculation unit 131 of the control unit 130 selects at least one of the plurality of the partial fingerprint registration data stored in the data storage unit 110 as reference data for comparison, and calculates a matching rate by comparing the selected partial fingerprint registration data with the partial fingerprint measurement data inputted through the data input unit 120. Here, the matching rate calculation unit 131 provides the authentication unit 133 with the calculated matching rate together with identification information on the partial fingerprint registration data having a relatively higher matching rate among the plurality of the partial fingerprint registration data with respect to the partial fingerprint measurement data (step S211).

Thereafter, the authentication unit 133 of the control unit 130 compares the matching rate calculated by the matching rate calculation unit 131 with an authentication threshold for determining whether the partial fingerprint measurement data can be used for fingerprint authentication (step S213). If the matching rate is equal to or greater than the authentication threshold (YES in step S213), the authentication unit 133 determines whether the partial fingerprint registration data having the relatively higher matching rate has been previously processed or not (step S215). Here, the authentication threshold may be adjusted depending on the security level threshold determined in step S203. For example, the authentication unit 133 may adjust the authentication threshold to be higher as the security level threshold is higher.

Further, when the identification information on the partial fingerprint registration data, which has a relatively higher matching rate among the plurality of the partial fingerprint registration data with respect to the partial fingerprint measurement data, is provided from the matching rate calculation unit 131, the authentication unit 133 accumulates and stores the identification information. If the identification information has been already accumulated and stored, the authentication unit 133 determines that the corresponding partial fingerprint registration data has been previously processed. For example, when the matching rate between the partial fingerprint measurement data obtained in step S209 and the selected partial fingerprint registration data in step S211 is equal to or greater than the authentication threshold, the authentication unit 133 stores identification information of the corresponding partial fingerprint registration data in the data storage unit 110 or stores it in an internal memory thereof. Therefore, when the partial fingerprint measurement data having the same identification information is provided by the matching rate calculation unit 131, it is possible to recognize that the data has been already stored in the data storage unit 110 or the internal memory by comparing the identification information.

Then, the authentication unit 133 calculates a security level accumulation value indicating high or low of the security level. Then, if the matching rate calculated in step S211 is equal to or greater than the authentication threshold (YES in step S213) and it is determined that the partial fingerprint measurement data has not been previously processed for the authentication (NO in step S215), the authentication unit 133 performs an increment of the security level accumulation value to increase its value (step S217). If the matching rate calculated in step S211 is equal to or greater than the authentication threshold (YES in step S213) and it is determined that the partial fingerprint measurement data has been previously processed for the authentication (YES in step S215), the authentication unit 133 maintains the security level accumulation value (step S219). If the matching rate calculated in step S211 is less than the authentication threshold, the authentication unit 133 performs a decrement of the security level accumulation value to decrease its value (step S221).

Then, the process proceeds to the step S207 again through the step S205 for showing a difference between the security level threshold and the current security level accumulation value, and the authentication unit 133 compares a current security level accumulation value with the security level threshold provided from the security level checking unit 135. If the security level accumulation value is less than the security level threshold (NO in step S207), the authentication unit 133 determines that the fingerprint authentication has failed and controls the output unit 140 to notify the failure of the fingerprint authentication. The output unit 140 outputs the failure of the fingerprint authentication on a screen or through a voice.

Here, even in the event that the matching rate calculated in step S211 is equal to or greater than the authentication threshold, the fingerprint authentication may be determined to have failed if the current security level accumulation value is less than the security level threshold. In other words, even if a correct user attempts to authenticate his or her fingerprint, the fingerprint authentication may be determined to have failed when the currently required security level is high.

In this case, the authentication unit 133 controls the output unit 140 to output, e.g., the security level notification window shown in FIG. 3 to show the difference between the security level threshold and the current security level accumulation value on a screen or through a voice under the control of the control unit 130. For example, as shown in FIG. 3, it may be displayed and identified that the current security level accumulation value 305 is lower than the currently required security level '4'.

When the fingerprint authentication has failed (NO in step S207), the user has to provide again at least a part of the entire fingerprint. The data input unit 120 obtains new partial fingerprint measurement data for the part of the entire fingerprint and transmits the new partial fingerprint measurement data to the control unit 130. At this time, the user can input the part of the entire fingerprint through the data input unit 120 by using a multi-touch method, a multi-finger touch method, or a rubbing or rolling method.

On the other hand, if the current security level accumulation value is equal to or greater than the security level threshold (YES in step S207), the authentication unit 133 determines that the fingerprint authentication has succeeded and controls the output unit 140 to output the success of the fingerprint authentication. Then, the output unit 140 outputs the success of the fingerprint authentication on the screen or through the voice under the control of the authentication unit 133 (step S223).

As described above, in accordance with the embodiment of the present disclosure, the fingerprint authentication is performed by using the partial fingerprint measurement data for the part of the entire fingerprint while adjusting the security level.

Therefore, as for services requiring relatively lower security levels such as a screen unlock and the like, the fingerprint authentication can be processed by lowering the security level. As for services requiring relatively higher security levels such as a mobile banking and the like, the fingerprint authentication can be processed by increasing the security level.

The combinations of respective sequences of a flow diagram attached herein may be carried out by computer program instructions. Since the computer program instructions may be executed by processors of a general purpose computer, a special purpose computer, or other programmable data processing apparatus, the instructions, c executed by the processor of the computer or other programmable data processing apparatus, create means for performing functions described in the respective sequences of the sequence diagram. Since the computer program instructions, in order to implement functions in specific manner, may be stored in a memory useable or readable by the computer or the computer for other programmable data processing apparatus, the instruction stored in the memory useable or readable by a computer may produce manufacturing items including an instruction means for performing functions described in the respective sequences of the sequence diagram. Since the computer program instructions may be loaded in a computer or other programmable data processing apparatus, instructions, a series of sequences of which is executed in a computer or other programmable data processing apparatus to create processes executed by a computer to operate a computer or other programmable data processing apparatus, may provide operations for executing functions described in the respective sequences of the flow diagram.

Moreover, the respective sequences may indicate some of modules, segments, or codes including at least one executable instruction for executing a specific logical function(s). In some alternative embodiments, it is noted that the functions described in the sequences may run out of order. For example, two consecutive sequences may be substantially executed simultaneously or often in reverse order according to corresponding functions.

The above description just illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. A fingerprint authentication method performed by a fingerprint authentication device implemented by a processor executing program code stored in a non-volatile computer memory device, the fingerprint authentication method comprising:

establishing a security level threshold, which is a target security level, corresponding to a type of service to be operated through an authentication;

acquiring and storing partial fingerprint measurement data corresponding to a plurality of parts of a single fingerprint as a plurality of parts of partial fingerprint registration data;

calculating a first matching rate by comparing data of subsequently acquired partial fingerprint measurement data with at least one part of the plurality of parts of partial fingerprint registration data stored in advance;

first determining whether the calculated first matching rate is equal to or greater than an authentication threshold that is determined based on the established security level threshold and whether the partial fingerprint measurement data has been previously processed for the authentication;

obtaining a current security level accumulation value by maintaining a previously obtained security level accumulation value, increasing the previously obtained security level accumulation value by a predetermined score, or decreasing the previously obtained security level accumulation value by the predetermined score based on a result of said first determining;

second determining whether the current security level accumulation value obtained in said obtaining is equal to or greater than the security level threshold;

in said second determining, when the current security level accumulation value is less than the security level threshold, the previously obtained repeating processes of said calculating, said first determining, said obtaining and said second determining until the current security level accumulation value becomes equal to or greater than the security level threshold; and determining and outputting a success of the authentication if the current security level accumulation value is equal to or greater than the security level threshold, wherein when the result of said first determining indicates that the matching rate with the at least one part of the partial fingerprint registration data is equal to or greater than the authentication threshold and the partial fingerprint measurement data has not been previously processed for the authentication, the previously obtained security level accumulation value is increased by the predetermined score in said obtaining, wherein when the result of said first determining indicates that the matching rate is equal to or greater than the authentication threshold and it is determined that the partial fingerprint measurement data has been previously processed for the authentication, the previously obtained security level accumulation value is maintained in said obtaining, and wherein when the result of said first determining indicates that the matching rate is less than the authentication threshold, the previously obtained security level accumulation value is decreased by the predetermined score in said obtaining.

2. The fingerprint authentication method of claim 1, further comprising outputting a difference between the current security level threshold and the security level accumulation value on a screen or through a voice speaker after the step of obtaining the current security level accumulation value.

3. The fingerprint authentication method of claim 1, wherein the previously obtained security level accumulation value is zero before said acquiring.

4. A non-transitory computer-readable storage medium storing instructions which, when executed by a processor, performs a fingerprint authentication method comprising:

establishing a security level threshold, which is a target security level, corresponding to a type of service to be operated through an authentication;

acquiring and storing partial fingerprint measurement data corresponding to a plurality of parts of a single fingerprint as a plurality of parts of partial fingerprint registration data;

calculating a first matching rate by comparing data of subsequently acquired partial fingerprint measurement data with at least one part of the plurality of parts of partial fingerprint registration data stored in advance in a memory unit;

first determining whether the calculated first matching rate is equal to or greater than an authentication threshold that is determined based on the established security level threshold and whether the partial fingerprint measurement data has been previously processed for the authentication;

obtaining a current security level accumulation value by maintaining a previously obtained security level accumulation value, increasing the previously obtained security level accumulation value by a predetermined score, or decreasing the previously obtained security level accumulation value by the predetermined score based on a result of said first determining;

second determining whether the current security level accumulation value obtained in said calculating is equal to or greater than the security level threshold;

in said second determining, when the current security level accumulation value is less than the security level threshold, repeating processes of said calculating, said first determining, said obtaining and said second determining until the current security level accumulation value becomes equal to or greater than the security level threshold; and determining and outputting a success of the authentication if the current security level accumulation value is equal to or greater than the security level threshold, wherein when the result of said first determining indicates that the matching rate with the at least one part of the partial fingerprint registration data is equal to or greater than the authentication threshold and the partial fingerprint measurement data has not been previously processed for the authentication, the previously obtained security level accumulation value is increased by the predetermined score in said obtaining, wherein when the result of said first determining indicates that the matching rate is equal to or greater than the authentication threshold and it is determined that the partial fingerprint measurement data has been previously processed for the authentication, the previously obtained security level accumulation value is maintained in said obtaining, and wherein when the result of said first determining indicates that the matching rate is less than the authentication threshold, the previously obtained security level accumulation value is decreased by the predetermined score in said obtaining.

5. A fingerprint authentication device comprising:

a data storage unit configured to store a plurality of partial fingerprint registration data, each of which corresponds to a part of a single fingerprint;

a data input unit configured to receive partial fingerprint measurement data for the authentication, which corresponds to a part of a single fingerprint;

a processor executing program code stored in a non-volatile memory device to perform the authentication by comparing the plurality of the partial fingerprint registration data and the partial fingerprint measurement data; and an output unit configured to output a result of the authentication under a control of the control unit, wherein the processor performs steps of:

establishing a security level threshold, which is a target security level, corresponding to a type of service to be operated through the authentication;

acquiring and storing the partial fingerprint measurement data inputted from the data input unit corresponding to a plurality of parts of a single fingerprint as a plurality of parts of partial fingerprint registration data;

calculating a first matching rate by comparing data of subsequently acquired partial fingerprint measurement data with at least one part of the plurality of the partial fingerprint registration data stored in advance;

first determining whether the calculated first matching rate is equal to or greater than an authentication threshold that is determined based on the established security level threshold and whether the partial fingerprint measurement data has been previously processed for the authentication;

obtaining a current security level accumulation value by maintaining a previously obtained security level accumulation value, increasing the previously obtained security level accumulation value by a predetermined score, or decreasing the previously obtained security level accumulation value by the predetermined score based on a result of the step of first determining;

second determining whether the current security level accumulation value obtained in the step of obtaining is equal to or greater than the security level threshold;

in the step of second determining, when the current security level accumulation value is less than the security level threshold, repeating the steps of acquiring, calculating the matching rate, first determining, obtaining and second determining until the current security level accumulation value becomes equal to or greater than the security level threshold; and determining and outputting a success of the authentication if the current security level accumulation value is equal to or greater than the security level threshold, wherein when the result of said first determining indicates that the matching rate with the at least one part of the partial fingerprint registration data is equal to or greater than the authentication threshold and the partial fingerprint measurement data has not been previously processed for the authentication, the previously obtained security level accumulation value is increased by the predetermined score in said obtaining, wherein when the result of said first determining indicates that the matching rate is equal to or greater than the authentication threshold and it is determined that the partial fingerprint measurement data has been previously processed for the authentication, the previously obtained security level accumulation value is maintained in said obtaining, and wherein when the result of said first determining indicates that the matching rate is less than the authentication threshold, the previously obtained security level accumulation value is decreased by the predetermined score in said obtaining.

6. The fingerprint authentication device of claim 5, wherein the processor is further configured to control the output unit to output a difference between the current security level threshold and the security level accumulation value on a screen or through a voice speaker after the step of obtaining the current security level accumulation value.

7. The fingerprint authentication device of claim 5, wherein the previously obtained security level accumulation value is zero before said acquiring.

* * * * *